United States Patent [19]

Newton

[11] Patent Number: 5,236,321
[45] Date of Patent: Aug. 17, 1993

[54] MOLD FOR MOLDING A FIBER REINFORCED ARTICLE

[76] Inventor: John R. Newton, Brackenthwaite House, Black Beck Wood, Storrs Pk., Bowness-on-Windemere Cumbria, England, LA23 3LS

[21] Appl. No.: 806,841

[22] Filed: Dec. 9, 1991

Related U.S. Application Data

[62] Division of Ser. No. 573,157, Sep. 13, 1990, abandoned.

[30] Foreign Application Priority Data

Apr. 5, 1988 [GB] United Kingdom ................ 8807907

[51] Int. Cl.$^5$ ............................................. B29C 45/14
[52] U.S. Cl. .................................... 425/123; 264/258; 264/324; 264/325; 425/127; 425/129.1
[58] Field of Search ................ 264/257, 258, 324, 325, 264/135, 136, 137, 102; 425/116, 400, 120, 123, 127, 129.1, 235, 543, 544, 516, 548, 577

[56] References Cited

U.S. PATENT DOCUMENTS

| | | | |
|---|---|---|---|
| 2,913,036 | 11/1959 | Smith | 264/102 |
| 4,560,523 | 12/1985 | Plumley | 264/102 |
| 4,873,044 | 10/1989 | Epel | 264/257 |

Primary Examiner—Tim Heitbrink
Attorney, Agent, or Firm—Reising, Ethington, Barnard, Perry & Milton

[57] ABSTRACT

A method of molding complex shapes by injecting a plastics material resin into fibers (24, 32) within a mold (10, 34) wherein one or more galleries (22, 40) is provided in the mold communicating with the fibres, the gallery or galleries being so arranged as prevent substantial deformation of the fibres into them. The galleries may be arranged transverse to the length of some or all of the fibres and be sufficiently narrow to prevent deformation of the fibres into them; or the galleries may lie in the same general direction as the length of the fibres and channel inserts (42) provided with a series of transverse slots (44) are employed within the galleries to prevent fibres being pressed into the galleries.

4 Claims, 3 Drawing Sheets

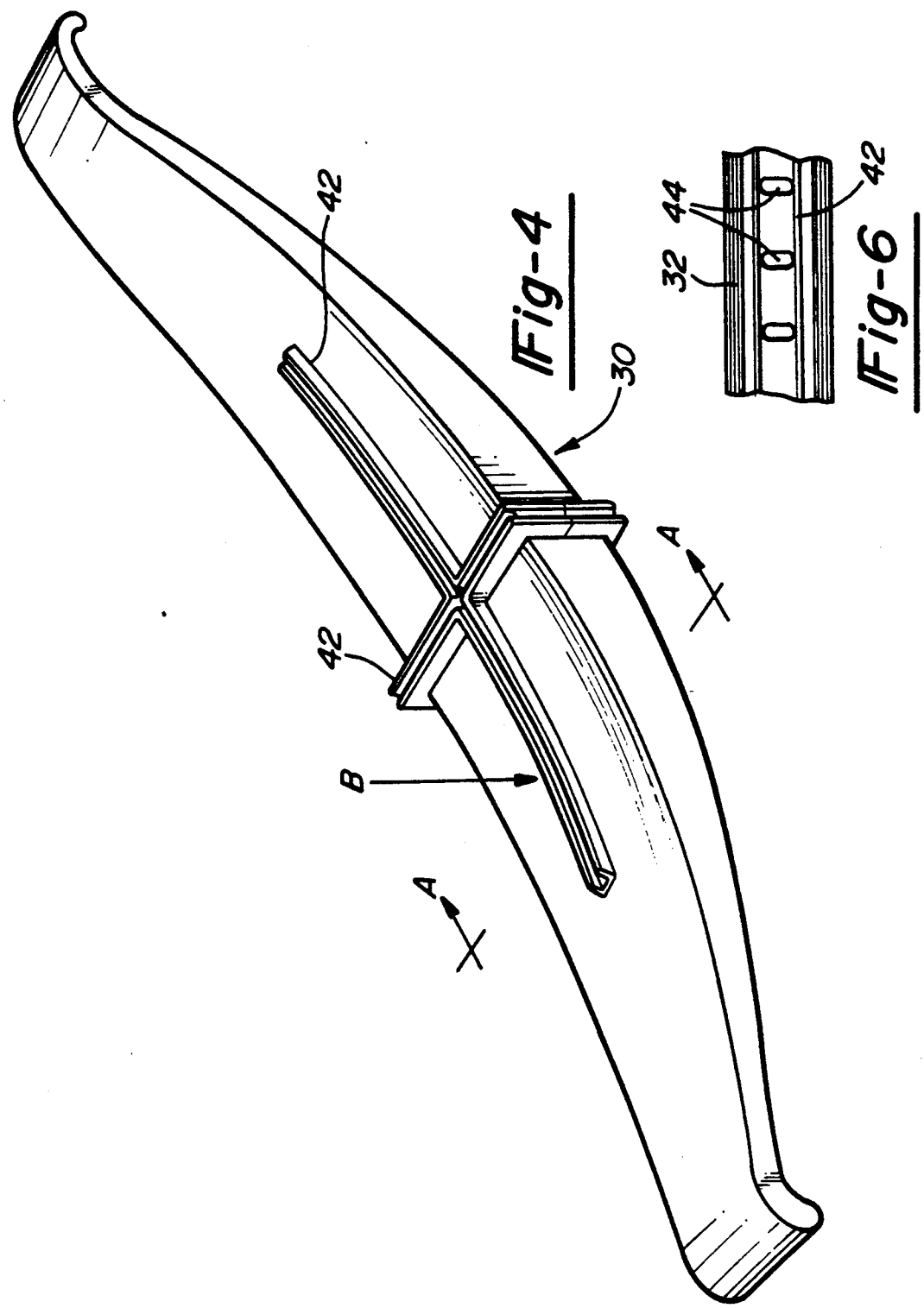

MOLD FOR MOLDING A FIBER REINFORCED ARTICLE

This application is a division of application Ser. No. 573,157, filed Sep. 30, 1990 now abandoned.

TECHNICAL FIELD

This invention relates to a method of molding and in particular relates to a method of molding complex composite articles from curable resins.

BACKGROUND OF THE INVENTION

A common method of molding composites, known as the resin transfer molding process, involves placing a structure of reinforcing fibers, for example glass, carbon of KEVLAR, into a mold and then injecting a liquid resin into the mold so that it penetrates through the entire reinforcing structure. The resin then cures producing a resin/fiber composite with good mechanical properties and relatively low weight. The final mechanical properties depend on the type of reinforcing fiber and resin employed. A conventional arrangement for transferring resin from a resin injection machine into the fibers in a mold is shown in FIG. 1 of the accompanying drawings. The nozzle from the resin injection machine is clamped to the injection port of the mold and pressurized resin is fed from the injection machine, entering the reinforcing fibres at the injection port. On large moldings more than one port may be used by this presents problems as the resin cures in the feed system and means must be provided for removing the cured resin.

In recent years there has been a significant increase in the complexity of moldings made by the resin transfer molding process brought about by the introduction of preforming which allows the assembly of complex configurations of reinforcing fibers together with, for example, the use of foamed plastics material inserts. Structures may now be produced of the type shown in FIG. 2 of the accompanying drawings where two skins are separated by foam inserts and interconnecting members are included. In order to inject resin successfully it is preferable to inject into both skins simultaneously. The mold used for such a component would, as illustrated, normally be split in such a way that the two skins lie on alternative mold faces. Therefore injecting resin into such a component requires two injection ports as shown in FIG. 2. In practice this is difficult to achieve since either two injection guns would be required or the resin would have to be gated to each port, or one port may be used but located at one edge thereby lengthening the injection cycle time.

Our PCT publication No. WO89/00495 provides a method of molding complex shapes having a skin portion to be injected with the resin and a core portion impenetratable to resin which comprises providing a core portion bearing one or more galleries placing same in a suitable mold and injecting resin into the gallery whereby it is rapidly transmitted to all portions of the skin.

The use of a gallery or galleries in the otherwise resin-impermeable core allows resin to be ducted to wherever needed according to the mold configuration by employing a single resin injection nozzle. The injection nozzle is inserted through the injection port through one skin of the article to be molded into the gallery thereof. On completion of the injection cycle the nozzle is removed prior to the resin curing and the injection port is plugged. The method of the invention allows very complex structures to be produced and cycle times reduced.

We have now found that a similar effect can be obtained by providing galleries in the inner surface of the mold rather than the core.

SUMMARY OF THE INVENTION

According to the present invention there is provided a method of mold composite articles. A method of molding complex shapes by injecting a resin material into fibers within a mold comprising a pair of mold halves including fibers therein, said mold halves meeting at a split line; and at least one gallery in at least one of the halves communicating with the fibers, the galleries being so arranged as to prevent substantial deformation of the fibers into the galleries.

Normally, it is preferably not to have galleries in the mold since this means that the mold itself will need to be modified, which is much less convenient than providing galleries in a foamed plastics core in accordance with our above PCT application. However, where no core is employed the method of the invention is useful. This is particularly the case in relation to certain highly stressed components such as springs and suspension arms in which cores or cross fibers cannot be tolerated.

Preferably these galleries, where they are open to the skin, are so arranged as to prevent substantial deformation of the fibers of the skin into them as described more fully hereinafter.

The method of the invention is primarily useful in relation to composites which are highly stressed in use and therfore require to have high proportion, e.g., 60% by weight or more, of fibers in the molded articles. We refer to the discussion in our above PCT application on the difficulties in injecting resin at a sufficiently fast rate into such high densities of fibre. Such considerations are equally applicable here, and the present invention overcomes such difficulties allowing such articles to be molded much more quickly than hitherto employing much lower pressures.

BRIEF DESCRIPTION OF THE DRAWINGS

The invention will be described further, by way of example, with reference to the accompanying drawings, in which:

FIG. 4 is a perspective view of a molded product produced by another embodiment of the invention;

FIG. 6 is view in direction of arrow B in FIG. 4.

DESCRIPTION OF THE PREFERRED EMBODIMENTS

Figure 1:
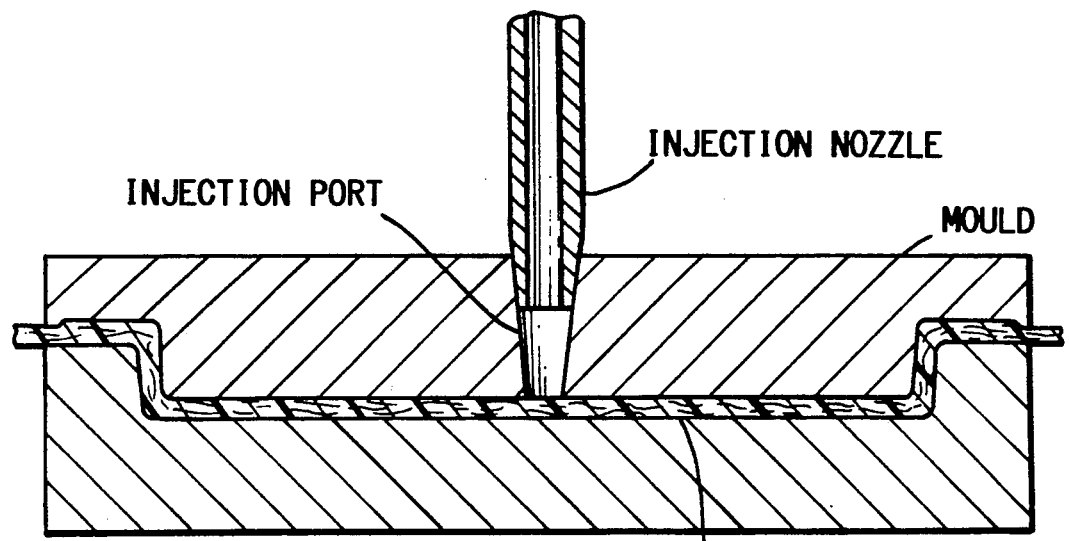
FIG. 1 is a diagrammatic cross sectional view of a mold used for conventional resin transfer molding.
Figure 2:
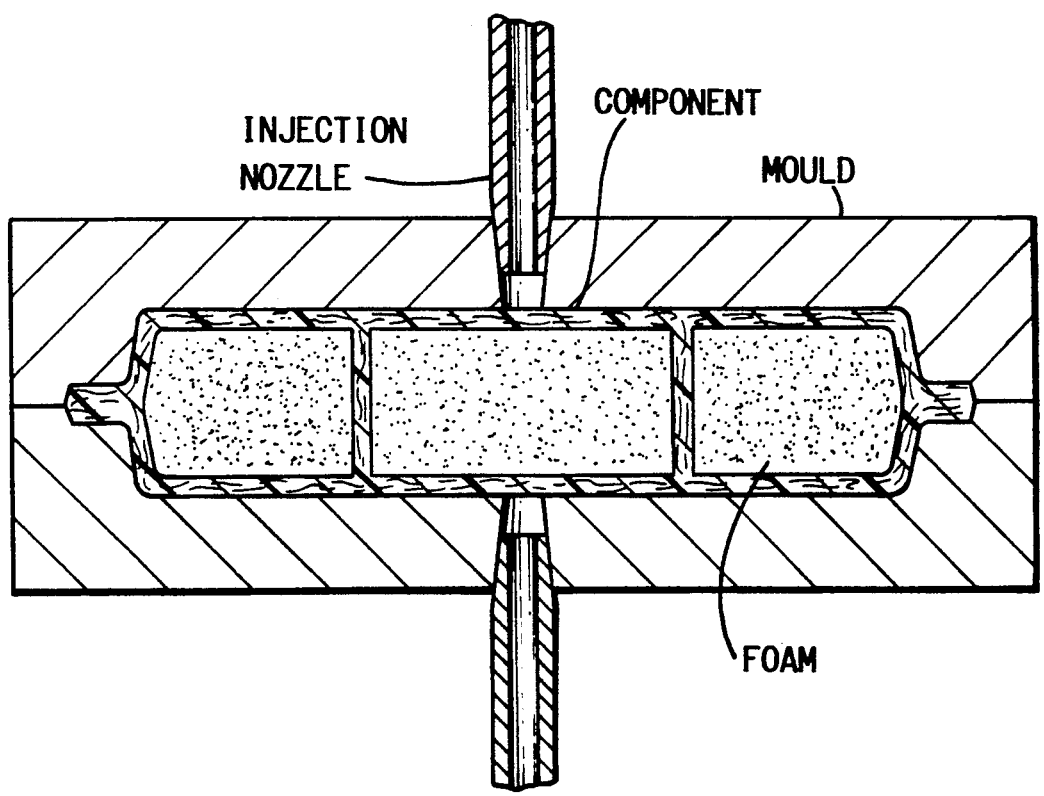
FIG. 2 is a similar view of FIG. 1 of a mold used for complex shapes and employing two injection nozzles.
Figure 3:
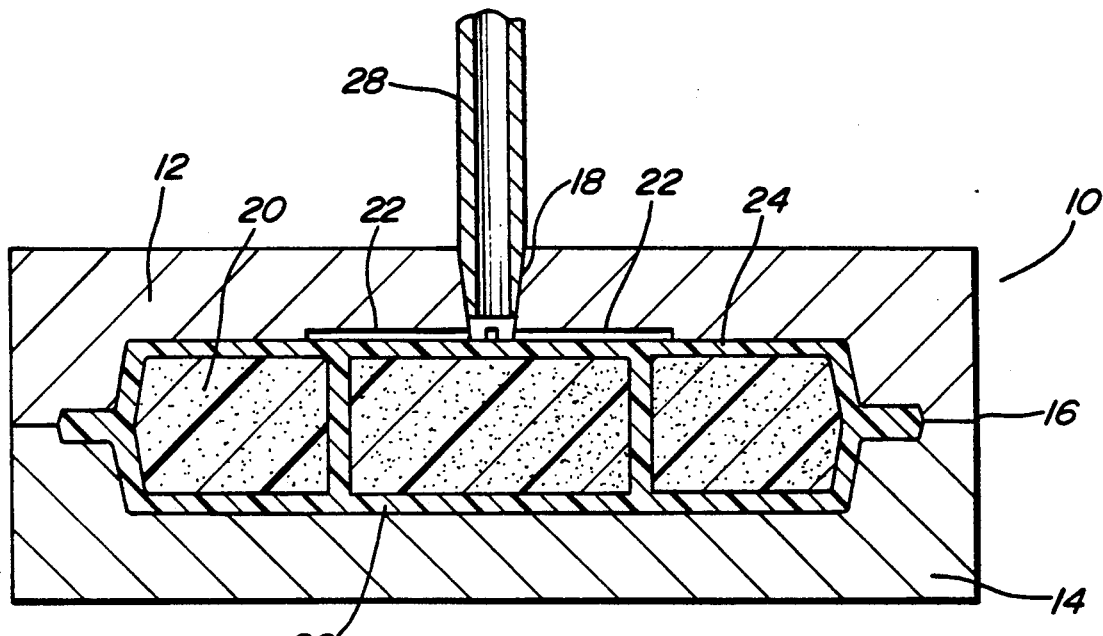
FIG. 3 is a similar view to FIG. 2 of a mold adapted to carry out the method of the invention.

Referring to the drawings, and especially FIG. 3, it can be seen that a mold 10 for producing a shape such as that shown in FIG. 2 comprises upper and lower mold halves 12, 14 respectively split at 16 and a single injection port 18. Resin-impenetrable cores 20 of, for example, closed cell foamed plastics material, are placed within the mold cavity surrounded by, for example, reinforcing fibers such as glass, carbon or KEVLAR, in a similar manner to conventional molding processes for producing composites. However, in accordance with the invention, the mold half 12 has a gallery 22 comprising a relatively deep but narrow groove or cavity running radially outwards from the nozzle 18 over the upper skin 24 of fibers.

An injection nozzle 28 is adapted to pass through the injection port 18 into the gallery 22. Injection of resin into the gallery 22 ensures that it is quickly and evenly distributed over the upper skin 24. Side vents (not shown) distributed about the split line 16 ensure that air displaced by the resin can leave the mold cavity.

One injection of the resin is complete the injection nozzle 28 is withdrawn and the port 18 is plugged after which the resin is cured or allowed to cure. Remolding in a conventional manner produces an article similar to that produced by the conventional mold of FIG. 2 and yet the molding apparatus employed allows rapid molding times even under low injection pressures since the principal limitation on speed, capilliary flow of resin through the fiber mat comprising the skin, has been essentially circumvented. The galleries not only increase distribution of resin but greatly enlarge the area of fiber open to receiving the resin, which speeds up passage of resin through the fiber layer. Further galleries for the lower skin 26 can be provided if desired.

The galleries will be at the surface of the mold cavity and be partly bounded by the reinforcing fibers constituting the skin. It is preferred that the "galleries" be sufficiently narrow so that the skin portion does not deflect or distort into them. Such surface galleries may advantageously be in the form of a fan or web of interconnecting channels.

Figure 5:
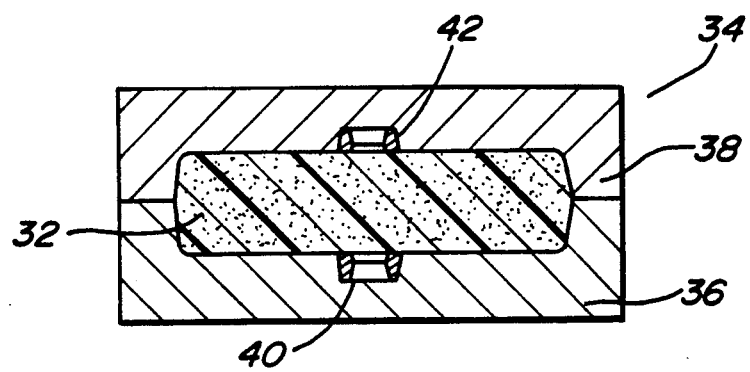
FIG. 5 is section on lines A—A of FIG. 4.

Referring now to FIGS. 4 to 6, an embodiment of the invention is illustrated which is particularly useful in connection with very highly stressed components such as springs and suspension arms made from composite materials. Such components require that all the fibers lays in one direction. The inclusion of cross fibers or cores cannot be tolerated as these act as stress raisers and lower the strength and performance of the product. However, the principles of the method of the invention can be applied to make these products also very much faster than was hitherto possible. FIG. 4 depicts a component 30, in this case a motor vehicle spring, formed of a composite material consisting of an array of glass or other fibres 32 laid generally parallel to the longitudinal axis of the component. No core is employed. The component 30 is produced in a mold 34 having two mold halves 36, 38 as before, each of the halves being provided with channels 40. Since all the fibres 32 in the component in question are aligned in one direction, a channel running in that direction could normally not be employed since the fibers would tend to be pressed into the channel thus blocking it. In order to overcome this, and in accordance with this embodiment of the invention, channel inserts 42 are provided within the channels. The inserts are generally channel shaped themselves and are provided with a series of transverse slots or openings 44 along their length. Thus, in the case of the channels 40 running parallel to the longitudinal axis of the component 30, the slots 44 run transverse to this axis and thus the fibers 32 are prevented from being pressed into the channel. The channels 40 and 42 between them form galleries for resin transfer allowing the resin to be distributed into the fibers 32 through each of the slots 44 along their length.

The product 30 when demolded has very much the appearance as shown in FIG. 4 with the channels 40 having solidified resin therein. However, it is a relatively simple matter to strip the channels 40 from the surface of the finished component. Moreover, in the case of spring or suspension units, where aesthetic qualities are not paramount, any slight marking left on the surface by the procedure will be of no account. This embodiment of the invention allows use of a single injection nozzle and yet rapidly distributes resin where it is required in the component being mold.

A further advantage of this latter embodiment is that the channel inserts 42 can perform a second very valuable function, that is they can be used as clamps to hold the dry fibers in place prior to presenting the fiber structure to the mold. In this way it would be possible automatically to lay-up dry fibers in a fixture, to the configuration of the final component, clamp them together using inserts 42, transfer to the mold and then inject the resin via the gallery network defined by the channels 40. Such a system lends itself to totally automatic operation. It is a relatively simple matter to make the channel components 42 interlocking to achieve the above end.

In certain cases it is desirable to mold on to the composite one or more additional components, e.g., external reinforcing members. Some or all of the channels 42 could be part of such components which, of course, would not be stripped off after demolding.

Although the method has been described in relation to resin transfer molding, it will be appreciated that it is of broader applicability and may be used with any composite molding where 'wicking' of resin through a fibrous reinforcement layer limits the molding speed and/or requires high injection pressures to be employed.

Since the resin in the gallery 22 will solidify and appear on the surface of the product as a raised rib, naturally the positioning of galleries must be chosen so that this will not adversely affect the utility of the product, e.g. will appear only on the "inside" surface thereof; alternatively such 'ribs' can be stripped or machined off before use.

I claim:

1. A mold for molding complex shapes by injecting a resin material into fibers within the mold, said mold comprising:
    a pair of substantially rigid mold halves meeting at a split line; and at least one gallery in at least one of the mold halves communicating with the fibers, the gallery being so arranged as to prevent substantial deformation of the fibers into the gallery;
    said gallery being in the form of an elongated channel with walls integrally formed with said respective rigid mold half, said channel and fibers having their respective lengths being substantially transverse to each other whereby said fibers are prevented from entering said channel during the injecting of resin into said mold halves.

2. A mold as defined in claim 1 further comprising:
    galleries in both of said substantially rigid mold halves with at least one gallery of one mold half being aligned and in communication with at least one gallery of said other mold half.

3. A mold for molding complex shapes by injecting a resin material into fibers within the mold, said mold comprising:
    a pair of substantially rigid mold halves meeting at a split line; and at least one gallery in at least one of the halves communicating with the fibers, the gallery being so arranged as to prevent substantial deformation of the fibers into the gallery;

said gallery being in the form of an elongated channel with walls integrally formed with said respective rigid mold half; and at least one channel insert being sized to be received within said gallery, said channel insert having a plurality of slots extending transverse to the length of the channel insert with the respective lengths of said slots and said fibers being substantially transverse to each other whereby said fibers are prevented from entering said gallery during injection of resin into said mold halves.

4. A mold as defined in both of said substantially rigid mold halves with at least one gallery of one mold half being aligned and in communication with at least one gallery of said other mold half.

* * * * *